US006351747B1

(12) United States Patent
Urazov et al.

(10) Patent No.: US 6,351,747 B1
(45) Date of Patent: Feb. 26, 2002

(54) METHOD AND SYSTEM FOR PROVIDING DATA TO A USER BASED ON A USER'S QUERY

(75) Inventors: Yuri Urazov, Forest Hills; Evgueni Belitski, Brooklyn, both of NY (US)

(73) Assignee: Multex.com, Inc., New York, NY (US)

( * ) Notice: Subject to any disclaimer, the term of this patent is extended or adjusted under 35 U.S.C. 154(b) by 0 days.

(21) Appl. No.: 09/290,121

(22) Filed: Apr. 12, 1999

(51) Int. Cl.[7] .................................................. G06F 17/30

(52) U.S. Cl. ............................ 707/10; 707/3; 707/101; 707/513; 707/516; 709/217; 709/219; 711/152

(58) Field of Search ............................... 707/1–4, 9, 10, 707/101, 513, 516, 100, 104, 200; 709/217, 219, 225, 229, 238, 203, 317; 705/35; 713/201; 711/152

(56) References Cited

U.S. PATENT DOCUMENTS

| 5,220,657 A | | 6/1993 | Bly et al. ..................... 711/152 |
| 5,802,518 A | | 9/1998 | Karaev et al. .................. 707/9 |
| 5,819,271 A | | 10/1998 | Mahoney et al. ............... 707/9 |
| 5,826,265 A | * | 10/1998 | Van Huben et al. ............ 707/8 |
| 5,835,722 A | * | 11/1998 | Bradshaw et al. ........... 709/217 |
| 5,873,077 A | * | 2/1999 | Kanoh et al. .................. 707/3 |
| 5,893,091 A | * | 4/1999 | Hunt et al. .................... 707/3 |
| 5,913,215 A | * | 6/1999 | Rubinstein et al. ........... 707/10 |
| 5,940,843 A | * | 8/1999 | Zucknovich et al. ....... 707/516 |
| 5,974,413 A | * | 10/1999 | Beauregerd et al. ........... 707/6 |
| 5,983,267 A | * | 11/1999 | Shklar et al. ................ 709/217 |
| 6,009,442 A | * | 12/1999 | Chen et al. .................. 707/522 |
| 6,038,561 A | * | 3/2000 | Snyder et al. .................. 707/6 |
| 6,055,538 A | * | 4/2000 | Kessenich et al. .......... 707/101 |

OTHER PUBLICATIONS

Tjoa, A. M. et al., Applying evolutionary algorithms to the problem of information filtering, Proceedings of the Eight International Workshop on Databse and Expert Systems Applications, Sep. 1–2, 1997, pp. 450–458.

Kaneko, Kunihiko et al., "Data Storage and Query Processing for Structured Document Database", Proceedings of the Eight International Wprkshop on Database and Expert Syatems Applications, Sep. 1–2, 1997, pp. 92–97.*

Tavakoli, Nassrin et al., "An Architecture for Parallel Search of Large, Full–text Databases", International Conference on Databases, Parallel Architectures and Their Applications, PARBASE–90, Mar. 7–9, 1990, pp. 342–349.*

Wang, Wenxian et al., "Concept Hierarchy Based Text Database Categorization in a Metasearch Engine Environment", Proceedings of the First International Conference on Web Information Systems Engineering, Jun. 19–21, 2000, vol. 1, pp. 283–290.*

* cited by examiner

*Primary Examiner*—Hosain T. Alam
*Assistant Examiner*—Shahid Alam
(74) *Attorney, Agent, or Firm*—Kenyon & Kenyon

(57) ABSTRACT

A method and system is described for notifying users of an arrival of a document. A respective query is received from each respective user. Each respective query includes at least one query term and at least one query condition. For each respective query, each one of the at least one query term is stored in a database only if the one query term is unique with respect to other query terms stored in the database. The document, which includes a document term being associated with the document, is received. The document term is compared with the stored query terms. For each respective query, a determination is made whether all of the at least one query condition of the respective query is satisfied as a function of the comparatione between the document term(s) and the stored query terms. For each respective query, if all of the at least one query condition of the respective query is satisfied, the respective user is notified of the arrival of the document.

37 Claims, 9 Drawing Sheets

FIG. 3A

Document Management Database - 200

| Reference Field - 205 | Document Field - 210 | Structured Record - 215 |
|---|---|---|
| # 101094 | IBM.wpd | Symbol (IBM), Industry (Hardware) |

Document record 201

FIG. 3B

Document Terms - 300

| First Document Field - 305 (Predefined Field) | Second Document Field - 310 (Keyword) |
|---|---|
| Symbol | IBM |

FIG. 4A

User Profile Database - 220

| Identification Field - 225 | Query Identification Field 228 | Query Field - 230 | Notification Field - 235 |
|---|---|---|---|
| User: XYZ | #10191 | Symbol (IBM) AND Industry (Hardware) | E-mail: userxyz@XYZ.com |
|  | #67190 | Symbol (IBM) | Pager: 917-209-8888 |
| User: ABS | #2698 | Symbol (APPL) | Fax 212-425-5288 |
|  | #110676 | Symbol (ZSE) |  |

User Record 221

FIG. 4B

Query Terms - 320

| First Query Field - 325 (Predefined Field) | Second Query Field - 330 (Keyword) | Third Query Field - 335 |
|---|---|---|
| Symbol | IBM | 0 |

Finite Automata Database - 250

| Term Field - 255 | Pointer Field - 260 |
|---|---|
| Symbol (IBM) | Query #10191<br>Query #67190 |
| Industry (Hardware) | Query #10191 |
|  |  |

FAD Record 251 encompasses the Symbol (IBM) and Industry (Hardware) rows.

FIG. 5A

FAD TERM - 350

| First Query Field - 325<br>(Predefined Field) | Second Query Field - 330<br>(Keyword) |
|---|---|
| Symbol | IBM |

FIG. 5B

METHOD AND SYSTEM FOR PROVIDING DATA TO A USER BASED ON A USER'S QUERY

FIELD OF THE INVENTION

The present invention is directed to a method and system for providing data to a user based on a user's query.

BACKGROUND INFORMATION

Financial research providers such as brokerage and investment banking firms spend large sums of money creating, printing and distributing thousands of graphic-rich research reports to investors (e.g., customers, remote sales offices, investment advisors, brokers, portfolio managers, etc.). Research providers seeking to reduce costs may consider distributing these reports electronically, from computer to computer. Electronic distribution is generally cost effective when compared with hard copy distribution methods. Communication networks, such as the Internet, enable information to be distributed to a wide range of people at locations around the world.

U.S. Pat. No. 5,802,518 to Karaev et al. and U.S. Pat. No. 5,819,271 to Mahoney et al., expressly incorporated herein by reference, describe electronic information distribution systems that allow remote users to receive, access and query information that is stored in electronic form at a central server, called a repository server. Users communicate with the repository server via, e.g., the Internet. The repository server is coupled to the Internet by a web server. The repository server comprises or is coupled to a plurality of databases of information stored in electronic form.

The repository server is coupled to one or more remote contributor workstations. The information that is stored at the repository server is received from the contributor workstations in electronic form. The information received from the contributor workstations are files comprising one or more documents. These documents typically contain text, data, charts, graphs, spreadsheets and the like, or combinations thereof, and may be in many formats. Any information that can be stored in digital form, such as photographs, videos, sound recordings, etc. may be stored in the files received from the contributor workstations. The files received from the contributor workstations are converted at a central site into a predetermined format, e.g., for printable documents, a common viewing format such as, for example, PDF format, and thereafter provided to the repository server. Each document submitted to the repository server may be accompanied by a document profile comprising information organized according to predefined fields relating to the document.

Each user has a user computer, such as, e.g., a personal computer with an Intel Pentium processor and a modem. The user computer may, or may not, have a local storage device. An example of a computer without a local storage device may be, e.g., a network computer, "thin" client, etc. The user may use the computer to connect to the repository via, e.g., the Internet, intranet, extranet and/or dial-in access.

The repository server can provide the user with a list of new documents that have been recently received by the repository server and which that user is authorized to access. The user may also request a list of documents that fit certain user-specified search criteria. A list of the documents that match that search criteria and which the user is authorized to access is provided to the user computer. The user can then select, request and view documents from these lists.

The web server is coupled to at least two database search engines in the repository server. At least one search engine performs at least full text searching of textual documents. At least one other search engine performs at least searching on predefined fields of information. When a search is submitted by the user to the web server, it is determined what type of search is required, and the appropriate query (e.g., full text, search on predefined fields) is formulated and submitted to the appropriate search engine. The search engine returns a results set to the web server. Typically, the results set comprises a list of documents satisfying the query and that the user has authorization to access.

When an external event occurs, i.e., a "news" event, users (e.g, investors) must be immediately notified in order to properly react to the news. The systems described in the Karaev '518 patent and the Mahoney '271 patent notify users of events using a "stored query" method. The "stored query" method first stores a user's query and then executes the "stored query" periodically. An incoming document is matched against every existing user profile. Each user profile identifies, for example, the type of documents or news the user is interested in seeing. This approach is time consuming. Accordingly, there is a need for a method and system for providing data to a user based on a user's query.

SUMMARY OF THE INVENTION

The present invention provides a method and system for notifying users of an arrival of a document. A respective query is received from each respective user. Each respective query includes at least one query term and at least one query condition. For each respective query, each one of the at least one query term is stored in a database only if the one query term is unique with respect to other query terms stored in the database.

The document, which includes a document term being associated with the document, is received. The document term is compared with the stored query terms. For each respective query, a determination is made whether all of the at least one query condition of the respective query is satisfied as a function of the comparatione between the document term(s) and the stored query terms. For each respective query, if all of the at least one query condition of the respective query is satisfied, the respective user is notified of the arrival of the document.

BRIEF DESCRIPTION OF THE DRAWINGS

FIG. 3a shows an exemplary embodiment of a Document Management Database.

FIG. 3b shows a document term of the Document Management Database illustrated in FIG. 3a.

FIG. 4a shows an exemplary embodiment of a User Profile Database.

FIG. 4b shows a query term of the User Profile Database illustrated in FIG. 4a.

FIG. 5a shows an exemplary embodiment of a Finite Automata Database.

FIG. 5b shows a FAD term of the Finite Automata Database illustrated in FIG. 5a.

DETAILED DESCRIPTION

General Overview

Figure 1:
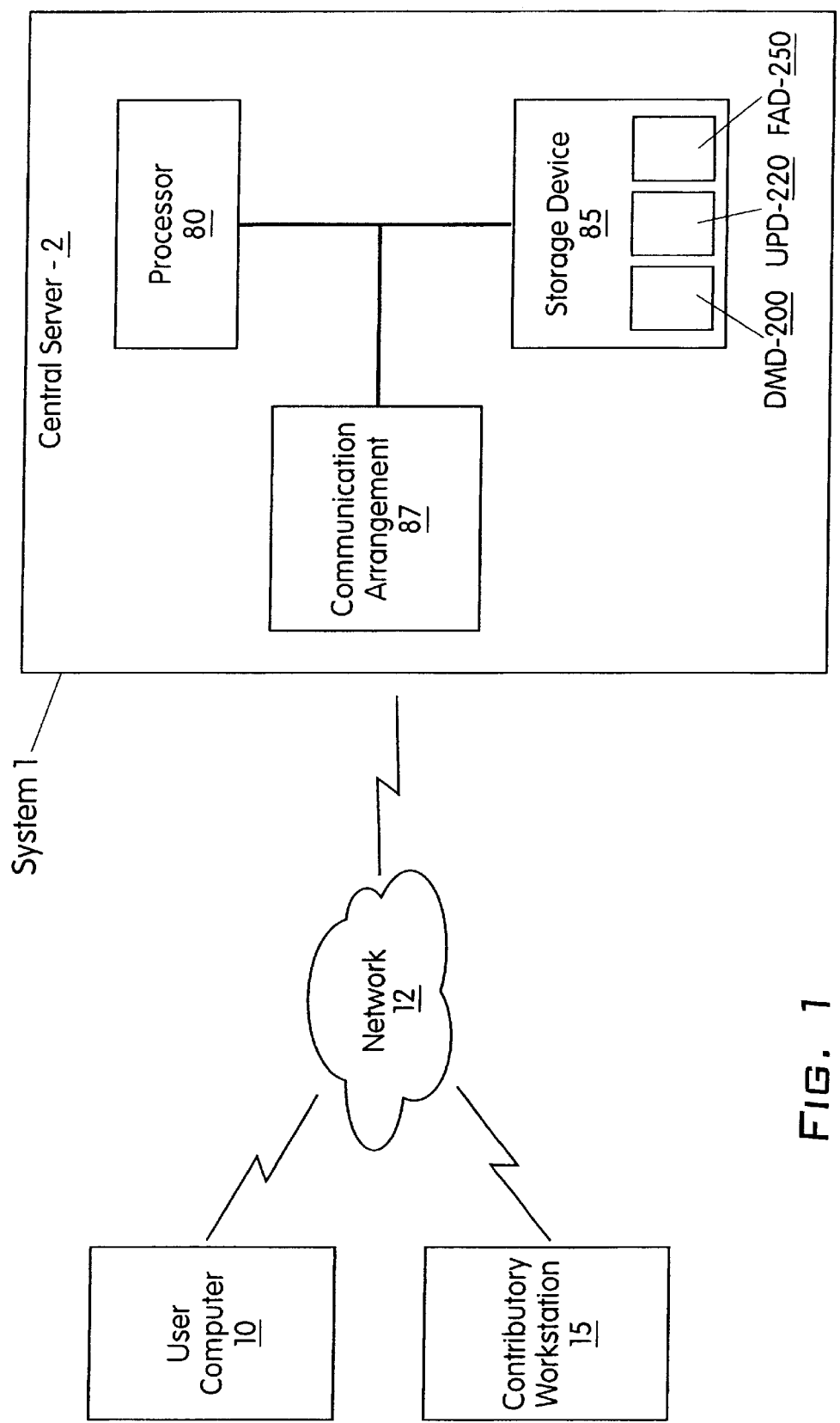
FIG. 1 shows an exemplary embodiment of a system according to the present invention.

FIG. 1 illustrates an overall architecture of a system 1 according to an example embodiment of the present invention. The system 1 includes a central server 2 which is coupled to a user computer 10 and a contributory workstation 15 via a network 12. The communication network 12 may include, e.g., the Internet, intranet, extranet, a conventional telephone network, a wireless network, a local or wide area network, a virtual network, etc.

A contributor at the contributory workstation 15 provides (i.e., contributes) documents (e.g., data, research, etc.) to the central server 2 via the network 12. The central server 2 receives and stores the documents. In accordance with the present invention, if a newly received document is of interest to the user at the user computer 10, (as determined by predefined criteria) and the user is entitled to access it, the central server 2 notifies the user as to the existence of the document at the central server 2 according to a predetermined notification procedure. Once the user receives the notification, the user may access the central server 2 via the network 12 to retrieve the particular document.

As used herein, the term "user" includes any end user who is permitted to receive or access information (and/or notification) via the present invention, such as, for example, customers of brokerage and investment banking firms, employees of brokerage and investment banking firms, investment advisors, brokers, bankers, portfolio and fund managers, journalists, analysts, economists, university professors, MBA students, etc. Of course, the present invention is not restricted to use in systems which provide financial research. Thus, the user may be any end user with access privileges. It also should be noted that the document may be provided to a computing device, a trading program, a news reporting agency, a bank, a governmental agency, etc.

The central server 2 of the system 1 may include at least one storage device 85, a processor 80 (including memory and other peripheral devices) and a communication arrangement 87 (e.g., a modem, a network interface card, etc.). The storage device 85 may store a Document Management Database ("DMD") 200, a User Profile Database ("UPD") 220 and a Finite Automata Database ("FAD") 250, which are described in detail below.

Document Management Database

The Document Management Database or the DMD 200 stores documents and document-related information received from the contributory workstation 15 via the network 12. In particular, referring to FIG. 3a, the DMD 200 stores a plurality of document records 201. Each document record 201 of the DMD 200 may include, e.g., a reference field 205, a document field 210 and a structured record 215. The reference field 205 includes a unique document reference number which is assigned to each document.

The document field 210 includes the actual document. The document may include any predefined data, e.g., news stories, research reports, morning meeting notes, etc. The document could contain text, data, charts, graphs, spreadsheets and the like, or combinations thereof, and may be in many formats. It will be appreciated that any information that can be stored in digital form, such as photographs, videos, sound recordings, etc. may be attached to the documents. If the document is not properly formatted, the central server 2 may convert the document into a predetermined format, e.g., for printable documents, a common viewing format such as, e.g., a PDF format.

Each document submitted to the central server 2 may be accompanied by a document profile which is stored in the structured record 215. The document profile includes information organized according to at least one document terms 300. FIG. 3b shows an exemplary embodiment of the document term 300 which may include, e.g., two fields: a first document field 305 and a second document field 310. The first document field 305 may include a predefined field, while the second document field 310 may include a keyword extracted from the document. For instance, if the particular document mentions IBM Corp., the predefined field may be "Company" and the keyword may be "IBM". The document term 300 may be expressed as follows: "(Company(IBM))", "Company=IBM", or "Company;IBM".

The predefined field may be, e.g., a stock symbol, a company name, a particular industry, a geographic location, date, a document type, a document text, etc. One skilled in the art would understand that the above list is exemplary and other fields are conceivable. Availability of the fields may depend on, e.g., the type of the document and may be adjusted instantaneously according to a predetermined procedure.

The present invention is not limited to the predefined fields. Further predefined field(s) may be available to the user. The further predefined fields may include certain text in any portion of the document. Thus, the central server 2 may amend the accompanied document profile to include further predefined field(s) which are not utilized by the contributory workstation 15 that provided the document profile. Furthermore, if the document submitted to the central server 2 is not accompanied by the document profile at all, then the central server 2 may generate the document profile by parsing the predefined field(s) and the further predefined field(s) and the corresponding keyword(s) from the document.

As shown in FIG. 3a, the document record 201 may include, e.g., "101094;IBM.wpd;Symbol(IBM), Industry (Hardware)". The document record 201 indicates that the document reference number is 101094 and that the document is stored in the storage device 85 as a file IBM.wpd. Furthermore, the document record 201 indicated that the document includes document terms 300 "Symbol(IBM), Industry(Hardware)".

User Profile Database

The storage device 85 also stores the User Profile Database or the UPD. The UPD includes particular information regarding each user. FIG. 4a shows an example embodiment of the UPD 220 which contains a plurality of user records 221. Each user record 221 may include, e.g., four fields: a user identification field 225, a query identification field 228, a query field 230 and a notification field 235.

The user identification field 225 may contain predetermined information to identify the user. Such information may include, for example, a user unique identification and a corresponding password. In addition, it may include user's access privileges. FIG. 4a shows an example of two user records, one associated with user "XYZ" and the other associated with user "ABS".

Each user record may include "user queries" which set forth, in the form of logical expressions, for example, criteria for selecting documents for which the user would like to receive notification. For example, user XYZ may be interested in receiving notification of all newly arrived documents associated with the ticker symbol IBM and a hardware industry. Accordingly, a query field 230 associated with user XYZ's user record would include, for example, a logical expression "Symbol(IBM) AND Industry(Hardware)."

In this case, "Symbol" may be a predefined document term. For example, a contributor of a document may specify in a document profile that the document is associated with the ticker symbol "IBM." However, the queries in the user records are not restricted to predefined document terms. For example, another logical expression in the query filed 230 may be "Text (IBM)" indicating that the user is interested in receiving notification of any document that contains "IBM" anywhere in the document.

User queries may be tagged with a unique identifier. As illustrated in FIG. 4a, for example, user XYZ's query is tagged with "10191" which may be stored in a query identification field 228 of user XYZ's user record.

A user record may include several user queries for each user. As shown in FIG. 4a, for example, the user record for user ABS includes three queries, each having a unique identification number. Query 67190 includes the expression "Symbol(IBM)," query 2698 includes the expression "Symbol(APPL)," and query 110676 includes the expression "Symbol(ZSE)."

The notification field 235 includes data that allows the user to indicate a particular notification procedure that has to be executed to notify the user when the document of interest is received by the central server 2. For instance, the user may be notified via E-mail, fax, telephone, a wireless communication, etc. The user may specify a particular notification message for a particular query. The notification message may include, e.g., a document title, the query terms 320, date, document reference number, etc.

The notification procedure may also be changed upon existence of a predetermined condition. For example, if the document contains certain urgent information, the user would be notified via a fax, otherwise the user could be notified by e-mail. Furthermore, the user may be notified in real-time, periodically and/or in accordance with a predetermined schedule. Moreover, the form of the notification may be as simple as providing a document number and arrival time of the document, or by providing a copy of the document itself. The notification "timing" information and notification "form" information may be stored in the UPD 220 in association with each user record, or may be stored in a separate file or database, for example.

As shown in FIG. 4a, the user XYZ prefers to be notified of documents satisfying query "10191" via an E-mail message to address "userxyz@XYZ.com." Additionally, user ABS prefers to be notified of documents satisfying query "67190" via a pager (telephone number 917-209-8888). User ABS also prefers to be notified of documents satisfying query "2698" or query "110676" via a facsimile transmission (fax number 212-425-5288).

The UPD 220 may be updated by the user. The user may access the central server 2 via the network 12. Upon providing, e.g., an appropriate identification and the password, the central server 2 may allow the user to create and update the user record 221 associated with that user (or other users if the user is, for example, a system administrator).

As indicated above, user queries are in the form of logical expressions. FIG. 4b shows that the query term 320 may actually include, e.g., three parts: a first query field 325, a second query field 330, and a third query field 335. The first query field 325 may include the predefined field (or, for example a "non-predefined field" term such as "Text"), as described above, and the second query field 330 may include a particular keyword. If the logical expression has more than one query term 320, the query terms 320 may be combined using at least one logical connector (e.g. AND, OR, NOT, etc.).

The third query field 335 may include "1" or "0", where "1" represents "true" and "0" represents "false". As a default, all of the query terms 320 of the UPD 230 are set to "0". For instance, the query term 320 may include "Symbol;IBM;0" which indicates that the user is searching for a particular document which includes a symbol IBM and that such query term was not found in the searched document.

Finite Automata Database

The storage device 85 may also store the Finite Automata Database ("FAD") 250. The FAD 250 provides a means with which the system is able to quickly and efficiently determine which users should be notified of a newly received document. The FAD 250, for example, combines search terms for all (or a subset of) users so that newly received documents may be processed quickly.

As shown in FIG. 5a, the FAD 250 includes a plurality of FAD records 251. Each record 251 includes, e.g., a term field 255 and a pointer field 260. As shown in FIG. 5b, the FAD term 350 includes the first query field 325 (predetermined field) and the second query field 330 (keyword) of the query term 320. In accordance with the exemplary embodiment of the present invention, none of the FAD terms 350 are duplicative. The pointer field 260 stores a pointer to the query identification field 228 of the corresponding query of the UPD 220.

Figure 7:
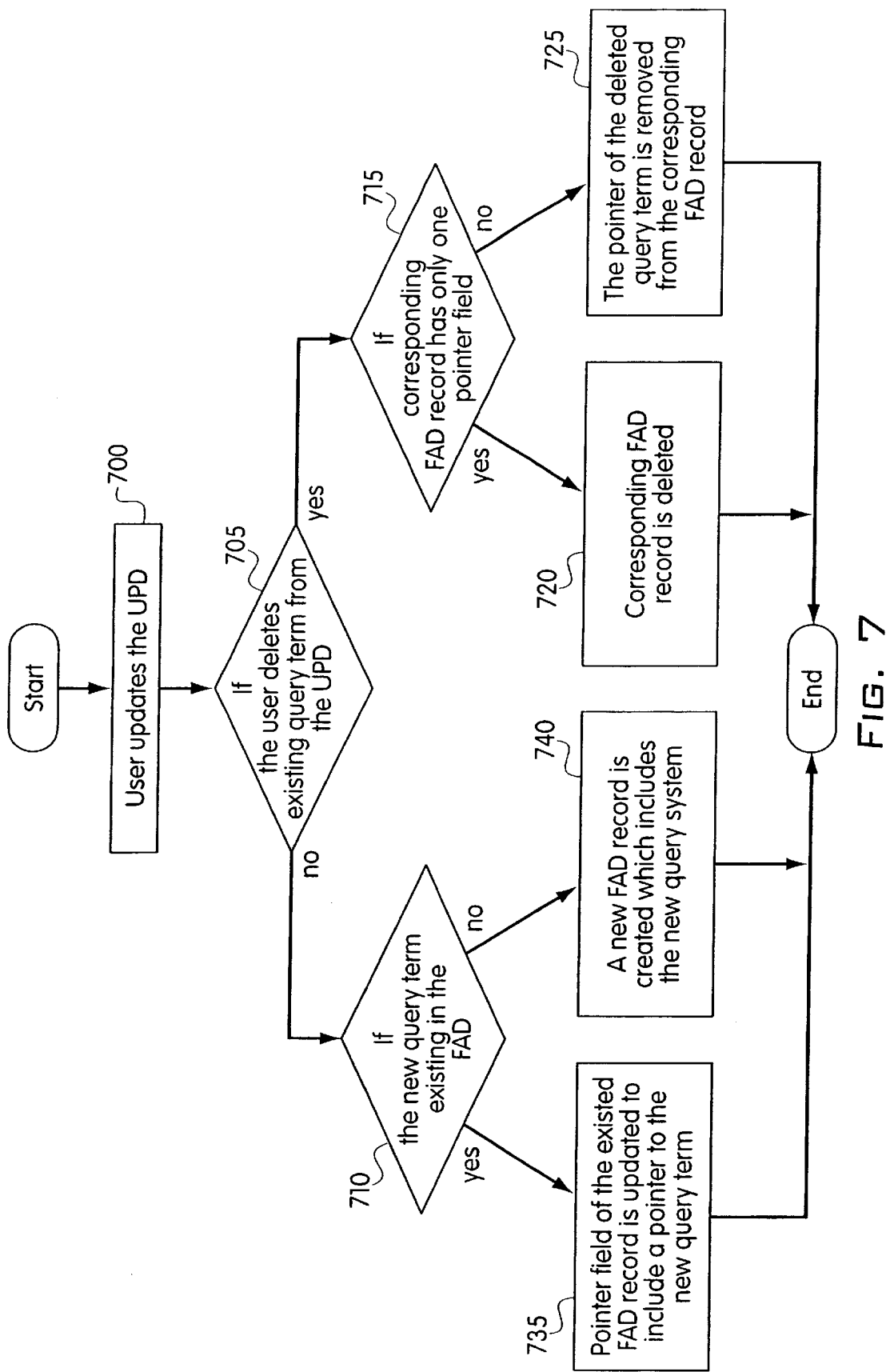
FIG. 7 shows an exemplary embodiment of a method for generating the Finite Automata Database according to the present invention.

FIG. 7 shows an exemplary embodiment of a method for generating the FAD 250 according to the present invention. The user may update the UPD 220 (step 700) by adding a new query term 320 and/or deleting an existing query term 320. A user change of the existing query term 320 may be interpreted as the deletion of the existing query term 320 and the addition of a new query term 320.

In accordance with the exemplary embodiment of the present invention, if the user deletes the existing query 320 from the UPD 220 (step 705), the central server 2 determines whether or not the corresponding FAD record 251 of the FAD 250 has a single pointer stored in the pointer field 260 (step 715). If the pointer field 260 has only one pointer, then it indicates that the corresponding FAD record 251 points only to the query term 320 that was deleted by the user. Consequently, the FAD record 251 which corresponds the deleted query term 320 is deleted (step 720). If the pointer field 260 has more than one pointer, then the pointer of the deleted query term 320 is removed from the pointer field 260 (step 725).

If the user adds a new query term 320 to the UPD 220 (step 710), the central server 2 compares the new query term 320 to the terms that already exist in the FAD 250 (step 735). If the new query term 320 does not exist in the FAD 250, then a new FAD record 251 is created (step 740). The new FAD record 251 would include the first query field 325 and the second query field 330 of the new query term 320. In addition, the query identification of the new query term 320 is stored in the pointer field 260.

However, if the FAD 250 has an existing FAD record 251 which already includes the new query term 320, then no new FAD record 251 is created (step 735). Instead, the pointer field 260 of the existing FAD record 251 is updated. In particular, the pointer field 260 of the existing FAD record 251 would include an additional pointer that points to the query identification field 228 of the new query term 320.

The FAD 250 may be updated instantaneously (e.g., upon creating the new query term 320 and/or deleting the existing query term 320). The FAD 250 may also be updated periodically or in a batch process executed once a day, for example.

Receiving A New Document

Figure 6:
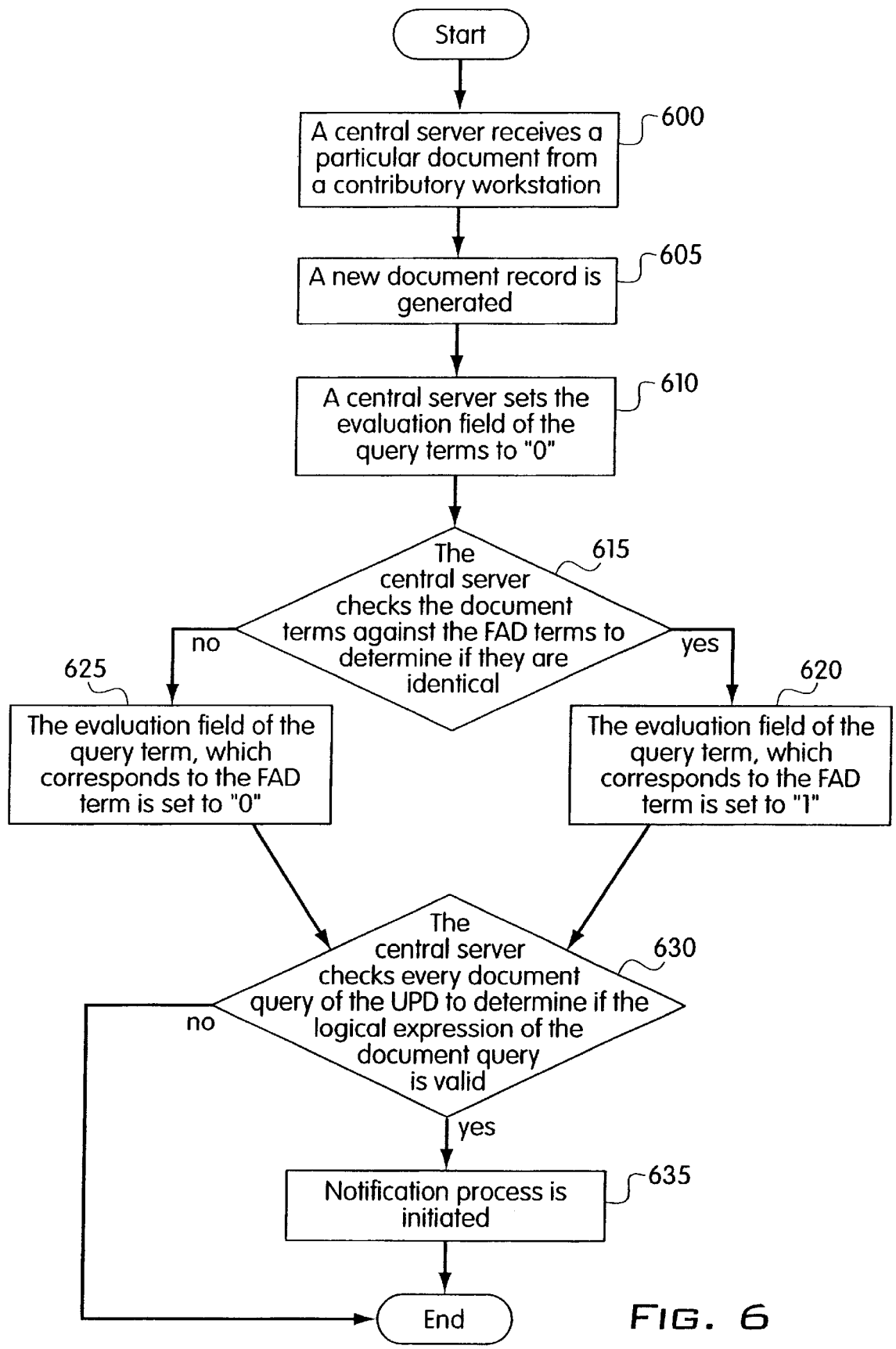
FIG. 6 shows an exemplary embodiment of a method according to the present invention.

FIG. 6 illustrates an exemplary process performed by the system 1 of FIG. 1 upon receiving a new document from a contributor work station.

A particular document (e.g., which includes certain information about IBM) is received from the contributory workstation 15 by the central server 2 (step 600). The document may be received via the network 12, or alternatively, may be manually delivered to the central server 2.

Once the document is received, the central server 2 generates a new document record 201 in the DMD 200 (step 605). In particular, the document is stored in the document field 210 of the new document record 201. In addition, a reference number is assigned to the document and is stored in the reference field 205 of the document record 201. A document profile may include a document term 300 (e.g., "Symbol(IBM)") which is stored in the structured record 215.

The central server 2 sets all of the third query fields 335 of the UPD 220 to "0," as a default (step 610). Subsequently, the central server 2 checks the document terms 300 (e.g., "Symbol(IBM)") against the FAD terms 350 stored in the FAD 250 (shown in FIG. 5a) to determine if they are identical (step 615). The document term 300 is identical to the FAD term 350 if the content of the first document field 305 of the document term 300 is identical to the predefined field of the FAD term 350 and if the content of the second document field 310 of the document term 300 is identical to the keyword of the FAD term 350. For instance, the document term 300 ("Symbol(IBM)") and the FAD term 350 ("Symbol(IBM)") have an identical predefined field "Symbol" and an identical keyword "IBM". Consequently, the document term 300 and the FAD term 350 are identical.

If the document term 300 is identical to the FAD term 350, then the evaluation term (which is stored in the third query field 335 of the query term 320), which corresponds to the FAD term 350 is set to "1" (step 620). Otherwise, the evaluation term remains "0" (step 625). In particular, a link between the query term 320 and the FAD term 350 is established using the pointer stored in the pointer field 260 of the FAD term 350. This pointer field 260 indicates which particular query of the UPD 220 includes the FAD term 350 which is identical to the document 300.

For instance, once the central sever 2 determines that the FAD term 350 "Symbol(IBM)" is identical to the document term 300 "Symbol(IBM)", then the central server 2 checks the pointer field 260 of the FAD term 350 "Symbol(IBM)". The pointer field 260 (as shown in FIG. 5a) includes the pointer to the query 10191 and the query 67190 of the UPD 220 (shown in FIG. 4a). The corresponding evaluation term of "Symbol(IBM)" of the queries 10191 and 67190 are set to "1".

Once all of the document terms 300 are checked, the central server 2 initiates a valuation procedure. The central server 2 checks every document query of the UPD 220 to determine if the logical expression of the document query is valid (step 630). For instance, the central server 2 checks the queries 10191, 67190, 2698 and 110676 of the UPD 220 (shown in FIG. 4a). In this case, only the logical expression of the query 67190 is valid because it includes only one term "Symbol(IBM)" which is identical to the document term 300 "Symbol(IBM)". It should be noted that the query 10191 is not valid because the document did not include a document term 300 which is identical to the query term "Industry (Hardware)".

If the logical expression of the document query is valid, then the central server 2 may initiate a notification procedure (step 635). In particular, the central server 2 may initiate the notification procedure for the user associated with query 67190.

The notification procedure notifies the user according to the user's preference which is stored in the notification field 235 that the document which is of interest to the user was received by the system 1. The central server 2 may transmit a notification message which may include the user's identification, the document reference number, etc. (or even the document itself). Once the user is notified, the user may access the document via, e.g., the network 12. The notification to the user ABS who established the query 67190, may be transmitted via a pager 917-209-8888.

It should noted that the system 1 may utilize a conventional queue (e.g., created using Microsoft's Message Queue (MSMQ)) to temporarily store the new document(s), user's queries, etc. The queue(s) are utilized when, e.g., a volume of incoming new document is larger then a predefined volume. The queue may be inserted in any predefined position in the system 1, e.g., between the network 12 and the central server 2 to store the new documents.

An advantage of the system 1 which utilizes the queue is that the system 1 allows provision optimal balancing between its components. In addition, the reliability and the dependability of the system 1 is increased when, e.g., some of its components temporarily fail. In the case of a failure, the queue may accumulate incoming documents for later processing after normal operation of the failed component is restored.

Alternative Embodiment

Figure 2:
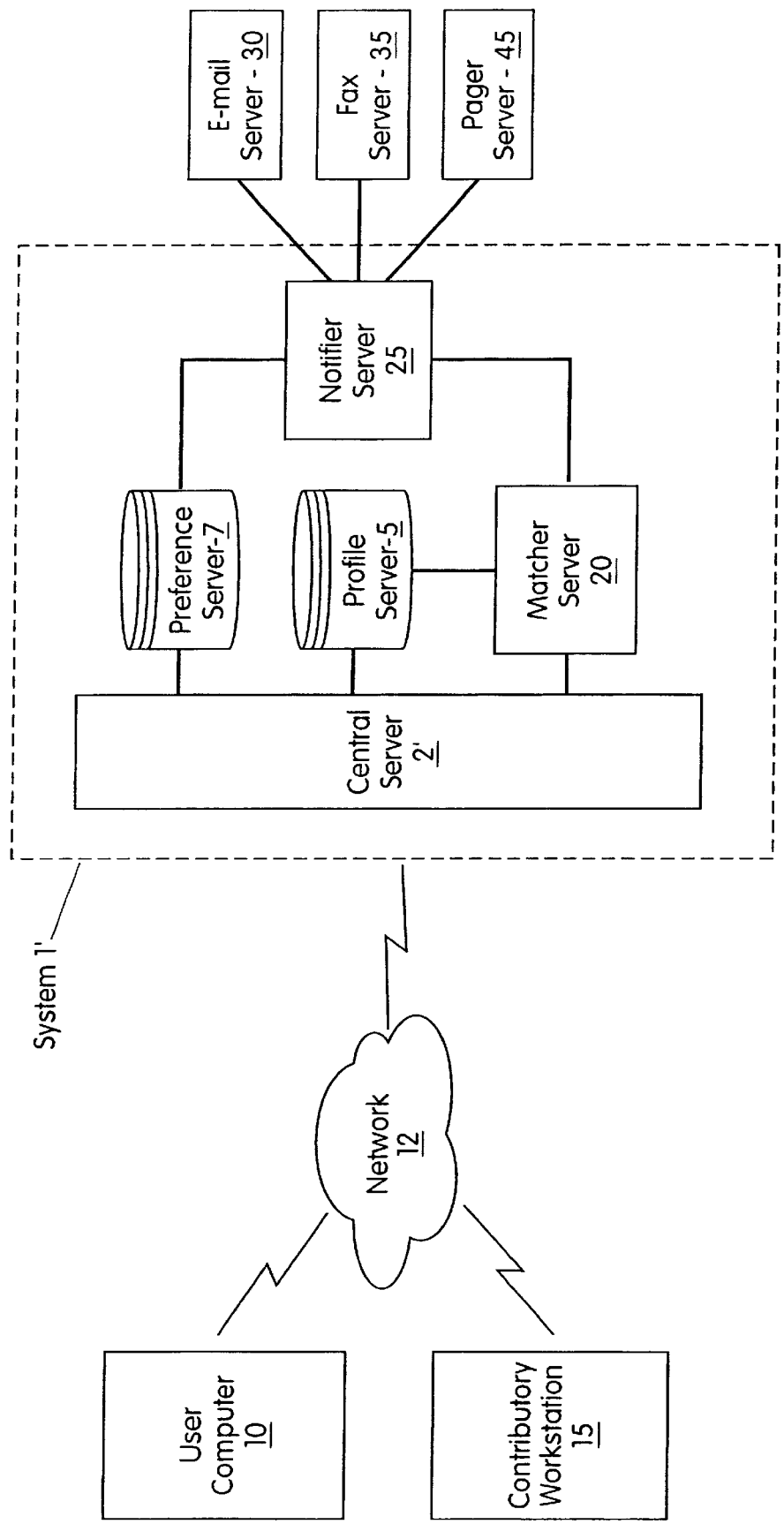
FIG. 2 shows an alternative exemplary embodiment of the system according to the present invention.

In an alternative exemplary embodiment according to the present invention, the system 1' includes a plurality of servers. In particular, as shown in FIG. 2, the system 1' includes a central server 2' which communicates with the user computer 10 and the contributory workstation 15 via the communication network 12. The central server 2' stores the DMD 200. The system 1' also includes a preference server 7 which stores a User Notification Preference Database ("UNPD") including user's notification procedures. In particular, the UNPD includes the query identification field 228 and the notification field 235.

In addition, the system 1' include a profile server 5 which stores a User Profile Query Database ("UPQD"). The UPQD includes the identification field 225, the query identification field 228 and the notification field 235. The profile server 5 also generates the FAD 250 as a function of the UPQD.

A matcher server 20 of the system 1' compares document terms of the DMD 200 to the FAD terms 350 of the FAD 250 to generate matches. The matcher server 20 determines which logical expressions of the UPQD are valid. A notification server 25 of the system 1' executes a corresponding notification procedure of the UNPD for the user's queries whose logical expression is fulfilled. The notification server 25 executes the notification procedure using an E-mail server 30, a fax server 35, and/or a pager server 45.

Another Alternative Embodiment

Figure 8:
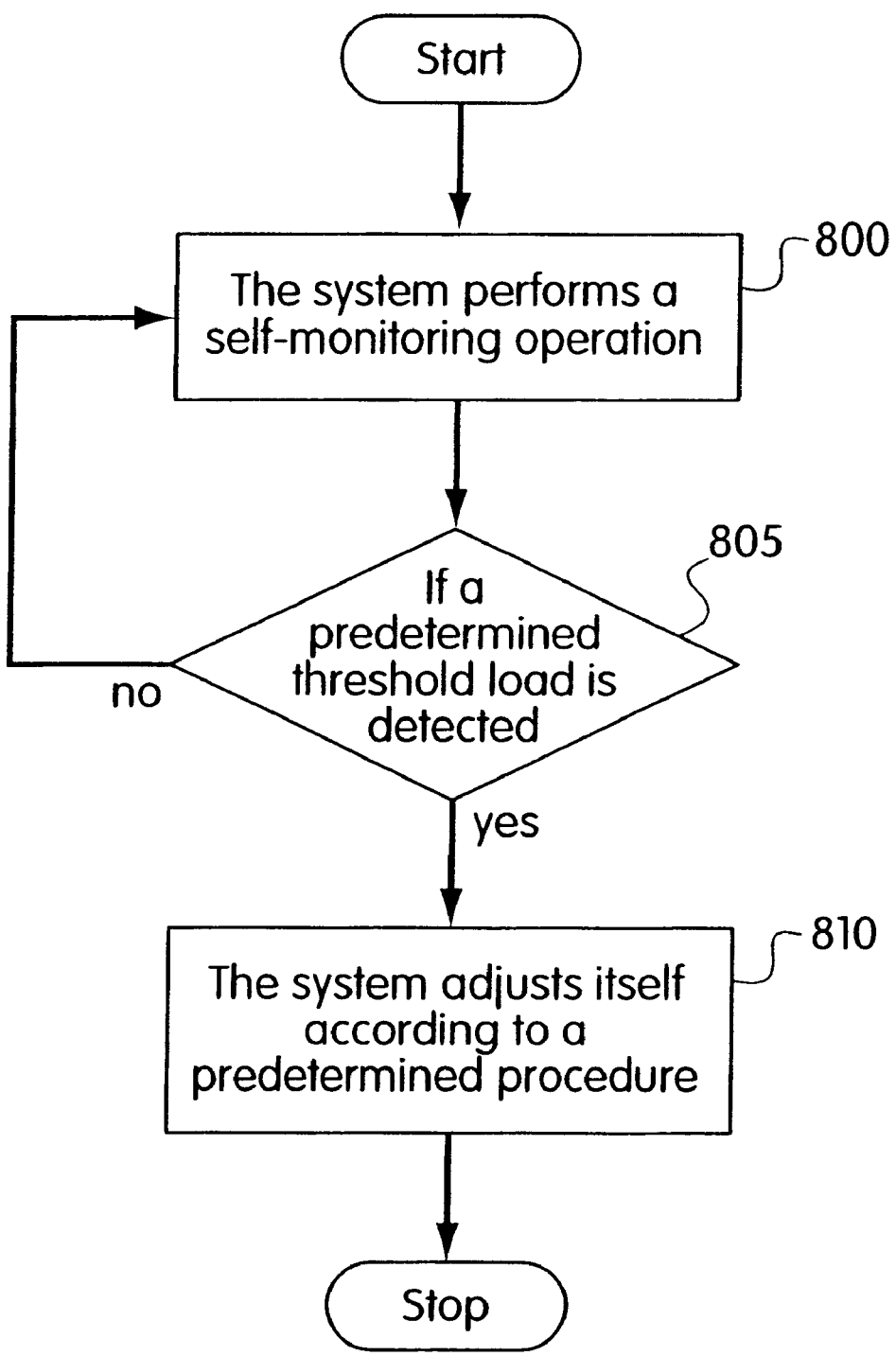
FIG. 8 shows an exemplary embodiment of a method for optimizing a performance of the system.

In another alternative embodiment, the system 1 (and/or the system 1') is capable of performing a method which includes a self-monitoring operation to optimize its performance. FIG. 8 shows an exemplary embodiment of the optimizing method. The system 1 performs the self-monitoring operation to determine if it has reached a predetermined load threshold (step 800). The predetermined load threshold may be determined as a function of a predetermined volume of documents, a predetermined volume of user queries, a predetermined volume of matches, or a predetermined volume of notification messages, for example.

If the predetermined load threshold is reached (step 805), the system 1 adjusts itself according to a predetermined procedure (step 810). In particular, the system 1 may generate a plurality of mirror-image systems, wherein each mirror-image system may include the DMD 200, the UPD 220 and the FAD 250. Each of the plurality of mirror-image systems has an identical copy of the databases 200, 220, 250 and is capable of performing functions identical to the functions of the system 1. Each mirror-image system is capable of being executed simultaneously (i.e., in parallel). Thus, utilizing the mirror-image system allows to optimize real-time matching and notification.

If the predetermined volume of the documents is detected, the system 1 may generate a predetermined number of the mirror-image systems. Each mirror-image system has an identical copy of the UPD 220 and the FAD 250, however, the DMD 200 may be different. The DMD 200 of the system 1, for example, may be divided between the mirror-image systems.

Similarly, if the predetermined volume of user queries is detected, then the user queries of the systems 1 would be divided among the mirror-image systems. Furthermore, if the predetermined volume of matches is detected, then the DMD 200, the UPD 220, and the FAD 250 of the systems 1 may be divided, according to a predetermined procedure, among the mirror-image systems. If the predetermined volume of notification messages is detected, then the notification preference and/or the UPD 220 may be divided among the mirror-image systems.

It should be noted that a particular database of the system 1 does not have to be divided equally. Instead, the particular database of the system 1 may be divided according to a predetermined procedure. An advantage of such division of the database(s) is to optimize the performance of the system 1.

Figure 9:
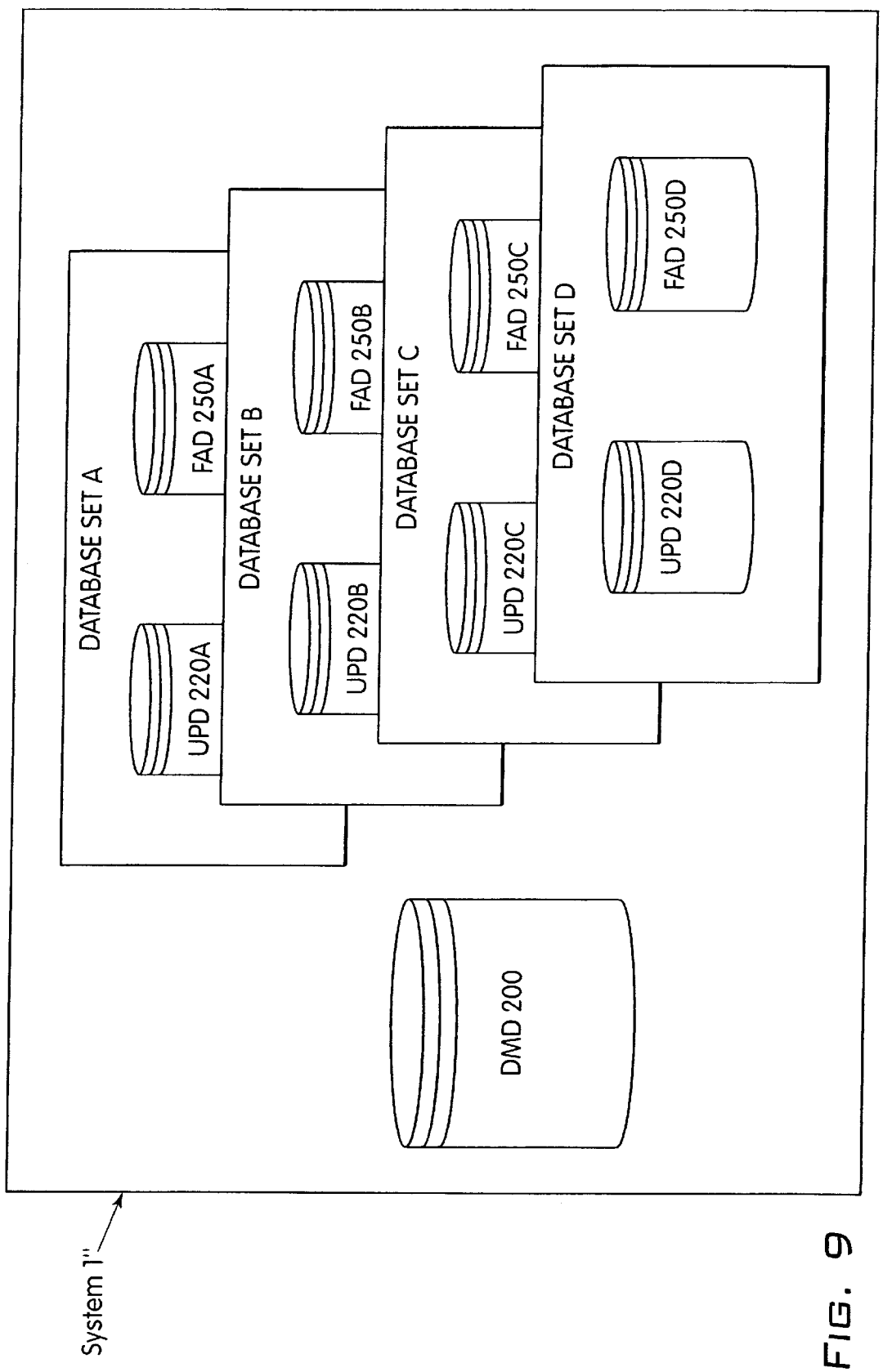
FIG. 9 shows an alternative exemplary embodiment of the system according to the present invention.

FIG. 9 shows a further exemplary embodiment of the system 1" according to the present invention which includes a single DMD 200 and a plurality of the UPDs 220 and the FADs 250. The UPDs 220 and the FADs 250 are combined in a single database set. Each database set and/or a particular database may be stored in the storage device 85 of the central server 2 or, alternatively, may be stored on separate servers.

As mentioned above, each database set of the system 1" may include the UPD 220x and the corresponding FAD 250x. For instance, the system 1" may include the database set A which includes a UPD 220A and a corresponding FAD 250A, a database set B which includes a UPD 220B and a corresponding FAD 250B, and a database set C which includes a UPD 220C and a corresponding FAD 250C. A combination of the UPDs 220A, 220B and 220C may be, for example, equivalent to the UPD 220 of the system 1.

The system 1" may generate the plurality of the database sets when the predefined load threshold (e.g., as described above) is reached. For instance, when the predetermined volume of the user queries is detected, the system 1" may generate the database sets A, B and C. The system 1" divides/splits the UPD 220 according to a predetermined procedure into the UPDs 220A, 220B and 220C. Based on the UPDs 220A, 220B and 220C, the corresponding FADs 250A, 250B and 250C are generated.

When the user submits a new query, the new query is assigned to a particular database set according to predetermined conditions(s). For instance, if the UPD 220A is overloaded (e.g., a particular parameter of the database set A is exceeded) user queries, user profiles, valid logical expressions, etc.), then the new query will be assigned to the UPD 220B. Subsequently, the system 1" generates the FAD 250B to incorporate the new query according to the above-described method.

If all of the existing database sets A, B, and C are overloaded, then the system 1" may generate an additional database set D which has the same structure as the database sets A, B and C. The database set D, which may include a UPD 220D and a FAD 250D, may store the new query. In addition, a predetermined number of particular queries of the UPDs 220A 220B and 220C may be transferred to the UPD 220D to optimize the performance of the system 1". For example, the system 1" may store queries of a particular user or queries that have identical terms in a single database set.

The system 1" may increase a number of database sets according to the current (e.g., real-time) load of the system 1". Similarly, the system 1" may delete or adjust a number of database sets if the load of the particular database set is less then a further predetermined threshold load. For example, if the database set A has 1,000 queries, the database set B has 8,000 queries and the database set C has 300, the system 1" may be adjusted so that each of the database sets A, B, C includes 1,100 queries. Alternatively, the system 1" may remove the set C and divide queries between the database sets A and B.

One advantage of the present invention, as compared to conventional systems, is an ability of the system 1 to execute user queries in parallel instead of sequentially. In fact, the present invention allows matching of user queries simultaneously. It is useful for systems that handle a large volume of particular documents and user queries.

What is claimed is:

1. A method for notifying users of an arrival of a document, comprising the steps of:
   (a) receiving from each respective one of the users a respective query, each respective query including at least one query term and at least one query condition;
   (b) for each respective query, storing in a database each one of the at least one query term only if the one query term is unique with respect to other query terms stored in the database;
   (c) receiving a document, a document term being associated with the document;
   (d) comparing the document term with the stored query terms;
   (e) for each respective query, determining whether all of the at least one query condition of the respective query is satisfied as a function of step (d); and
   (f) for each respective query, if all of the at least one query condition of the respective query is satisfied, notifying the respective one of the users of the arrival of the document.

2. The method according to claim 1, further comprising the steps of:
   (g) generating a plurality of further databases as a function of the database if at least one predetermined condition is satisfied; and
   (h) performing steps (c)–(f) simultaneously for each of the plurality of further databases.

3. The method according to the claim 2, wherein one of the plurality of further databases stores the at least one query term which is unique with respect to another of the plurality of further databases.

4. The method according to the claim 2, further comprising the step of:

(i) generating a copy of the document for each of the plurality of further databases.

5. The method according to claim 2, wherein the least one predetermined condition is satisfied if at least one of:

a number of the users is greater then a predetermined number of users, a number of respective queries is greater than a predetermined number of queries, a number of documents is greater then a predetermined number of documents, a number of the at least one query term is greater than a number of predetermined queries terms;

a number of the at least one query condition is greater then a predetermined number of query conditions, and a number of the at least one satisfied condition is greater than a number of satisfied query condition.

6. The method according to claim 1, further comprising the step of:

(j) associating with each one of the respective users a respective method of notification;

wherein the notifying step includes the step of notifying the one of the respective users via the respective method of notification.

7. The method according to claim 6, further comprising the step of:

(k) selecting, by each respective user, the respective method of notification.

8. The method according to claim 6, wherein the respective method of notification includes at least one of facsimile transmission, E-mail messaging, and paging.

9. A method for notifying users of an arrival of a document, comprising the steps of:

receiving a document, at least one document term being associated with the document;

comparing query terms to the at least one document term, the query terms being stored in a database and being unique with respect to all others of the query terms, each of the query terms being associated with at least one query having a respective query condition, each at least one query being associated with a respective user;

for each at least one query, determining whether the respective query condition is met as a function of the comparing step; and if the respective query condition is met, notifying the respective user of the arrival of the document.

10. The method according to claim 9, further comprising the step of:

associating with each respective user a respective method of notification;

wherein the notifying step includes the step of notifying the respective user via the respective method of notification.

11. The method according to claim 10, further comprising the step of:

selecting, by each respective user, the respective method of notification.

12. A method for receiving notification of a document, comprising the steps of:

selecting by a user a method of notification;

transmitting by the user a respective query, the respective query including at least one query term and at least one query condition, each at least one query term which is unique with respect to other query terms stored in a database being stored in the database; and receiving by the user a notification of a document via the selected method of notification, the notification being transmitted to the user only if all at least one query condition of the respective query is satisfied by the document, a determination of satisfaction being determined as a function of a comparison of document terms to the query terms stored in the database.

13. A method for providing first data to a user as a function of a query, the query being generated by the user, the method comprising the steps of:

(a) generating second data as a function at least one first term of the query, the second data including at least one second non-duplicative term;

(b) comparing at least one third term of the first data with the at least one second term;

(c) if the at least one second term matches to the at least one third term, setting the at least one first term to an active state, the at least one first term corresponding to the at least one matched second term;

(d) determining a result of the query as a function of a particular state of the at least one first term; and (e) providing a further data to the user if the result is equal to a predetermined value, the further data correspond to the first data.

14. The method according to claim 13, further comprising the step of:

(f) generating third data which includes at least one notification procedure, the third data being generated by the user.

15. The method according to claim 14, wherein the at least one notification procedure utilizing at least one of e-mail, fax and telephone.

16. The method according to claim 14, further comprising the step of:

(g) notifying the user, according to the at least one notification procedure, if the result is equal to the predetermined value; and (h) providing the user with access to the first data.

17. The method according to claim 16, wherein step (g) includes the substep of selecting a particular notification procedure of the at least one notification procedure as a function of a predetermined criteria.

18. The method according to claim 16, wherein step (g) is performed in real-time.

19. The method according to claim 13, further comprising step of:

(i) receiving the first data from a predetermined source.

20. The method according to claim 13, wherein step (a) includes the substeps of:

determining if the second data includes a new term of the at least one first term, and if the second data does not includes the new term, adding the new term to the second data.

21. The method according to claim 13, wherein step (a) is performed in real-time.

22. The method according to claim 13, wherein at least one of steps (b)–(e) is performed in real-time.

23. The method according to claim 13, wherein step (e) includes the substep of providing the further data to the user if the user is authorized to received the first data.

24. The method according to claim 13, wherein the at least one first term includes a plurality of first terms, the plurality of the first term being combined using at least one logical connector.

25. The method according to claim 13, further comprising the step of:

(j) parsing the first data to generate the at least one third term.

26. The method according to claim 13, further comprising the steps of:
   (k) generating at least one first further data as a function of the first data;
   (l) generating at least one second further data as a function of the second data, a number of the at least one first further data being equal to a further number of the alt least one second further date;
   (m) performing steps (b)–(e) simultaneously the at least one first further data and a corresponding data of the at least one second further data.

27. The method according to claim 26, further comprising the step of:
   (n) performing steps (k)–(m) as a function of at least one predetermined condition.

28. The method according to claim 27, wherein the at least one predetermined condition includes a value of at least one of the at least one first term, the least one second term and the least one third term is greater than a predetermined volume value.

29. A system for providing first data to a user as a function of a query which is generated by the user, the system comprising:
   a memory storage device;
   a communication arrangement; and
   a processor generating second data as a function at least one first term of the query, the second data including at least one second non-duplicative term, the processor comparing at least one third term of the first data with the at least one second term,
   wherein if the at least one second term matches to the at least one third term, the processor sets the at least one first term to an active state, the at least one first term corresponding to the at least one matched second term,
   wherein the processor determines a result of the query as a function of a particular state of the at least one first term, the processor provides, via the communication arrangement, a further data to the user if the result is equal to a predetermined value, the further data correspond to the first data, and
   wherein the memory storage device storing at least one of the first data, the second data and the further data.

30. The system according to claim 29, wherein the communication arrangement is at least one of a modem and a network interface card.

31. The system according to claim 29, wherein the system provides the further data to the user via a network.

32. The system according to claim 31, wherein the network includes at least one of the Internet, intranet, extranet and a dial-in-access network.

33. The system according to claim 29, further comprising:
   a queue arrangement temporarily storing at least one of the first data, the second data and the further data.

34. The system according to claim 29, wherein the system performed a self-monitoring function to determine if a predetermined condition is satisfied.

35. The system according to claim 34, wherein if the predetermined condition is satisfied, the system generates at least one of first further data as a function of the first data and at least one of second further data as a function of the second data, a number of the at least one first further data being equal to a further number of the at least one second further data.

36. The system according to claim 29, wherein the user includes at least one of a news reporting agency, an investor, a computing device, a trading program, a governmental agency, a bank.

37. A computer-readable storage medium storing a set of instructions, the set of instructions capable of being executed by a processor for notifying users of an arrival of a document, the set of instructions performing the steps of:
   receiving from each respective user a respective query, each respective query including at least one query term and at least one query condition;
   for each respective query, storing in a database each one of the at least one query term only if the one query term is unique with respect to other query terms stored in the database;
   receiving a document, a document term being associated with the document;
   comparing the document term with the stored query terms;
   for each respective query, determining whether all of the at least one query condition of the respective query is satisfied as a function of the comparing step; and
   for each respective query, if all of the at least one query condition of the respective query is satisfied, notifying the respective user of the arrival of the document.

* * * * *